United States Patent
Bae et al.

(10) Patent No.: US 10,348,961 B2
(45) Date of Patent: Jul. 9, 2019

(54) CAMERA MODELING SYSTEM

(71) Applicants: HANWHA TECHWIN CO., LTD., Gyeonggi-do (KR); HANWHA PRECISION MACHINERY CO., LTD., Gyeongsangam-do (KR)

(72) Inventors: Soonmin Bae, Changwon-si (KR); Hana Hong, Changwon-si (KR)

(73) Assignees: HANWHA PRECISION MACHINERY CO., LTD., Seongsan-gu (KR); HANWHA TECHWIN CO., LTD., Seongnam-si (KR)

( * ) Notice: Subject to any disclaimer, the term of this patent is extended or adjusted under 35 U.S.C. 154(b) by 249 days.

(21) Appl. No.: 14/672,353

(22) Filed: Mar. 30, 2015

(65) Prior Publication Data
US 2015/0288878 A1    Oct. 8, 2015

(30) Foreign Application Priority Data
Apr. 3, 2014    (KR) .................. 10-2014-0040061

(51) Int. Cl.
*G06T 7/73*    (2017.01)
*H04N 5/232*    (2006.01)

(52) U.S. Cl.
CPC .......... *H04N 5/23229* (2013.01); *G06T 7/73* (2017.01); *G06T 2207/30196* (2013.01); *G06T 2207/30244* (2013.01)

(58) Field of Classification Search
CPC .............................. H04N 5/23229; G06T 7/73
(Continued)

(56) References Cited

U.S. PATENT DOCUMENTS 6,591,005 B1 *   7/2003   Gallagher ............ G06K 9/3208
                                                                  382/154
7,356,425 B2 *   4/2008   Krahnstoever .......... G06T 7/80
                                                                   702/94
(Continued)

FOREIGN PATENT DOCUMENTS

JP    2005233846 A    9/2005
JP    2010025569 A    2/2010
JP    201 31 341 86 A    7/2013

OTHER PUBLICATIONS

Orghidan et al. "Camera calibration using two or three vanishing points", Proceedings of the Federated Conference on Computer Science and Information Systems pp. 123-130, IEEE 2012.*
(Continued)

*Primary Examiner* — Richard A Hansell, Jr.
(74) *Attorney, Agent, or Firm* — Sughrue Mion, PLLC

(57) ABSTRACT

A camera modeling system. The camera modeling system includes: a vanishing point detecting module configured to detect, from at least one reference detection object existing in a detection region, a first vanishing point and a second vanishing point; a view mode determining module configured to determine a camera view mode on the basis of a distance from a first position in the detection region to the first vanishing point and a distance from the first position to the second vanishing point; and a camera modeling module configured to select a camera modeling mode corresponding to the determined camera view mode and perform camera modeling through the selected camera modeling mode.

15 Claims, 10 Drawing Sheets

(58) Field of Classification Search
USPC .......................................................... 348/169
See application file for complete search history.

(56) References Cited

U.S. PATENT DOCUMENTS

| | | | | |
|---|---|---|---|---|
| 9,160,979 | B1* | 10/2015 | Ulmer | H04N 7/18 |
| 10,147,233 | B2* | 12/2018 | Engle | G06T 19/006 |
| 2001/0048816 | A1* | 12/2001 | Takahashi | G03B 15/00 |
| | | | | 396/351 |
| 2004/0095385 | A1* | 5/2004 | Koo | G06T 15/20 |
| | | | | 715/757 |
| 2004/0264763 | A1* | 12/2004 | Mas | G01C 23/00 |
| | | | | 382/154 |
| 2010/0266212 | A1* | 10/2010 | Maurer | G06K 9/00624 |
| | | | | 382/206 |
| 2010/0295948 | A1* | 11/2010 | Xie | G06T 7/80 |
| | | | | 348/175 |
| 2012/0081512 | A1* | 4/2012 | Shimizu | G06K 9/00798 |
| | | | | 348/36 |
| 2012/0141015 | A1* | 6/2012 | Yu | G06T 7/13 |
| | | | | 382/154 |
| 2012/0249837 | A1* | 10/2012 | Chen | H04N 5/2625 |
| | | | | 348/239 |
| 2013/0070108 | A1* | 3/2013 | Aerts | F01D 21/003 |
| | | | | 348/187 |
| 2014/0104437 | A1* | 4/2014 | Chao | H04N 17/002 |
| | | | | 348/187 |
| 2014/0193039 | A1* | 7/2014 | Wexler | G01C 11/04 |
| | | | | 382/106 |

OTHER PUBLICATIONS

Guillou E. et al. "Using vanishing points for camera calibration and coarse 3D reconstruction from a single image", The Visual Computer (2000) 16:396-410.*

Orghidan R. et al. 'Camera calibration using two or three vanishing points', IEEE Proceedings of the Federated Conference on Computer Science and Information Systems pp. 123-130, Sep. 9-12, 2012.*

Orghidan R. et al. 'Camera calibration using two or three vanishing points', IEEE Proceedings of the Federated Conference on Computer Science and Information Systems pp. 123-130, Sep. 9-12, 2012 (Year: 2012).*

Guillou E. et al. "Using vanishing points for camera calibration and coarse 3D reconstruction from a single image", The Visual Computer (2000) 16:396-410. (Year: 2000).*

* cited by examiner

CAMERA MODELING SYSTEM

RELATED APPLICATION

This application claims the benefit of Korean Patent Application No. 10-2014-0040061, filed on Apr. 3, 2014, in the Korean Intellectual Property Office, the disclosure of which is incorporated herein by reference in its entirety.

BACKGROUND

1. Field

One or more exemplary embodiments relate to camera modeling systems and methods.

2. Description of the Related Art

Conventionally, a user performs camera modeling by directly inputting camera parameters such as an angle, a focal distance, and an installation height of a camera, or by finding camera parameters by setting a box representing an object of a predetermined size after directly setting a side-view mode or a top-view mode. However, the user is inconvenienced by having to directly input the camera parameters. Also, in the case of setting a box representing an object after setting a side-view mode or a top-view mode, the results are susceptible to the user's input.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY

Exemplary embodiments overcome the above disadvantages and other disadvantages not described above. Also, an exemplary embodiment is not required to overcome the disadvantages described above, and an exemplary embodiment of the present inventive concept may not overcome any of the problems described above.

One or more exemplary embodiments include systems for automatically performing a camera modeling process on camera parameters such as an angle, a focal distance, an installation height, and a measurement mode of a camera used for object detection/tracking, object classification, and the like.

Additional aspects will be set forth in part in the description which follows and, in part, will be apparent from the description, or may be learned by practice of the presented exemplary embodiments.

According to an aspect of an exemplary embodiment, there is provided a camera modeling system that includes: a vanishing point detecting module configured to detect, from at least one reference detection object existing in a detection region, a first vanishing point and a second vanishing point; a view mode determining module configured to determine a camera view mode on the basis of a distance from a first position in the detection region to the first vanishing point and a distance from the first position to the second vanishing point; and a camera modeling module configured to select a camera modeling mode corresponding to the determined camera view mode and perform camera modeling through the selected camera modeling mode.

The vanishing point detecting module may be further configured to detect the first and second vanishing points from a plurality of reference detection objects and is further configured to surround each reference detection object with a respective box; the first vanishing point may be derived from intersection points of straight lines connecting correspondent points of at least one pair of boxes among the boxes; and the second vanishing point may be an intersection point of straight lines connecting tops and bottoms of the boxes respectively.

The first position may be a center of the detection region.

The view mode determining module may be further configured to determine the camera view mode according to a difference between the distance from the first position to the first vanishing point and the distance from the first position to the second vanishing point.

The camera view mode may be any one from among a side-view mode, a top-view mode, and a uniform-view mode.

The camera modeling module may be further configured to perform the camera modeling by selecting the camera modeling mode as an adaptive parameter determination mode when the camera view mode is the side-view mode; perform the camera modeling by selecting the camera modeling mode as a direct parameter determination mode when the camera view mode is the top-view mode; and perform the camera modeling by selecting the camera modeling mode as the adaptive parameter determination mode, the direct parameter determination mode, or a combination of the adaptive parameter determination mode and the direct parameter determination mode when the camera view mode is the uniform-view mode.

The uniform-view mode may include one from among a uniform-view mode close to the side-view mode and a uniform-view mode close to the top-view mode perform the camera modeling by selecting the camera modeling mode as an adaptive parameter determination mode when the camera view mode is the uniform-view mode close to the side-view mode; and perform the camera modeling by selecting the camera modeling mode as a direct parameter determination mode when the camera view mode is the uniform-view mode close to the top-view mode.

According to an aspect of another exemplary embodiment, there is provided a camera modeling method that includes detecting a first vanishing point and a second vanishing point from a plurality of reference detection objects existing in a detection region; determining a camera view mode on the basis of a distance from a first position in the detection region to the first vanishing point and a distance from the first position to the second vanishing point; and selecting a camera modeling mode corresponding to the determined camera view mode and performing camera modeling through the selected camera modeling mode.

According to an aspect of another exemplary embodiment, there is provided an apparatus that includes a processor configured to: identify an object in a detection region as a reference detection object that provides orientation information relative to a surface; detect a first vanishing point based on the reference detection object; detect a second vanishing point based on the reference detection object; detect a first distance between a first point in the detection region and the first vanishing point; detect a second distance between the first point and the second vanishing point; and determine an orientation of a camera capturing the detection region based on the first distance and the second distance.

The camera may be further configured to determine a view mode of the camera according to the determined orientation of the camera.

Other features and aspects will be apparent from the following detailed description, the drawings, and the claims.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
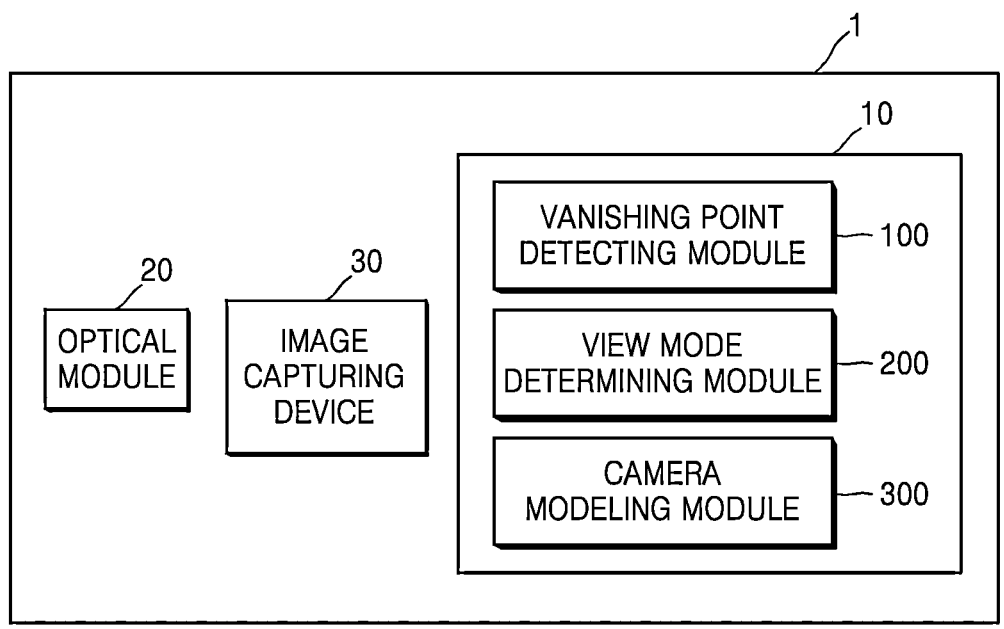
FIG. 1 is a schematic block diagram of a camera modeling system according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, expressions such as "at least one of," when preceding a list of elements, modify the entire list of elements and do not modify the individual elements of the list.

Hereinafter, exemplary embodiments will be described in detail with reference to the accompanying drawings.

FIG. 1 is a schematic block diagram of a camera modeling system according to an exemplary embodiment.

At least one of the components, elements or modules represented by a block as illustrated in FIG. 1 may be embodied as various numbers of hardware, software and/or firmware structures that execute respective functions described above, according to an exemplary embodiment. For example, at least one of these components, elements or modules may use a direct circuit structure, such as a memory, processing, logic, a look-up table, etc. that may execute the respective functions through controls of one or more microprocessors or other control apparatuses. Also, at least one of these components, elements or modules may further include a processor such as a central processing module (CPU) that performs the respective functions, a microprocessor, or the like. Further, at least one of these components, elements or modules may be specifically embodied by a module, a program, or a part of code, which contains one or more executable instructions for performing specified logic functions, and may be implemented by a processor such as a CPU. Two or more of these components, elements or modules may be combined into one single component, element or module which performs all operations or functions of the combined two or more components, elements of modules. Further, although a bus is not illustrated in the above block diagrams, communication between the components, elements or modules may be performed through the bus. Functional aspects of the above exemplary embodiments may be implemented in algorithms that execute on one or more processors. Furthermore, the components, elements or modules represented by a block or processing steps may employ any number of related art techniques for electronics configuration, signal processing and/or control, data processing and the like.

Referring to FIG. 1, a camera 1 includes a camera modeling system 10 according to an exemplary embodiment. The camera 1 obtains an image by converting a light from an optical module 20 into an electrical image signal through an image capturing device 30, and transmits the image to the camera modeling system 10.

Figure 2:
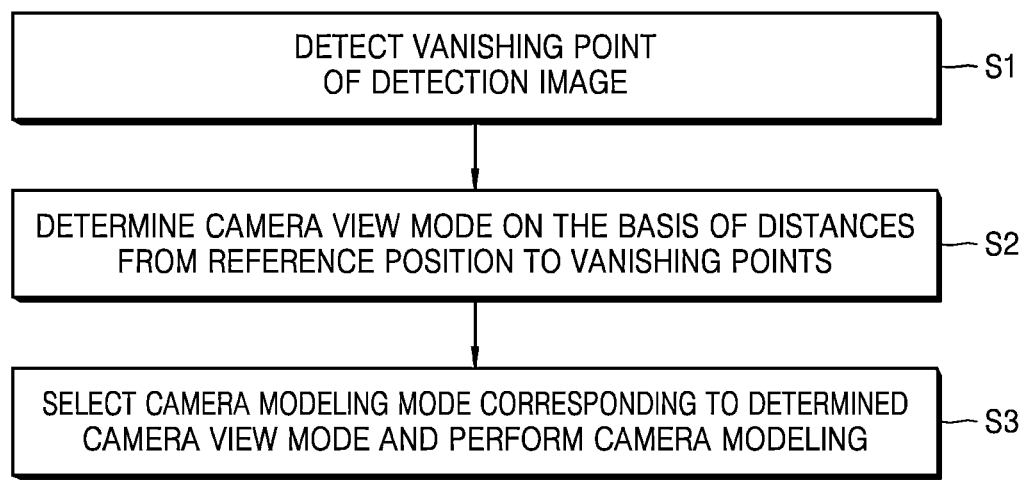
FIG. 2 is a schematic flow diagram of a method for operating a camera modeling system according to an exemplary embodiment.

FIG. 2 is a schematic flow diagram of a method for operating a camera modeling system according to an exemplary embodiment. Hereinafter, respective operation steps of FIG. 2 will be described together with the description of FIG. 1.

Referring to FIG. 1, the camera modeling system 10 according to the present exemplary embodiment may include a vanishing point detecting module 100, a view mode determining module 200, and a camera modeling module 300.

The vanishing point detecting module 100 detects a vanishing point within an image and outputs the vanishing point to the view mode determining module 200 (S1).

The vanishing point detecting module 100 uses a reference detection object to detect the vanishing point. A reference detection object corresponds to an object that has a similar size and shape as an object to be detected through the camera 1 after completion of camera modeling. For example, when the object to be detected through the camera 1 is a person, the reference detection object may be determined as a real person or a mannequin that has a similar size to a person.

In general, the reference detection object is not a simple geometrical figure and has a complex shape like a person, vehicle, animal, plant, and the like. In other words, the reference detection object is an object that has a generally accepted orientation relative to the ground. A person stands upright so their feet are one the ground, the wheels of a car are on the ground, a dog stands upright so their legs are on the ground, a tree has a trunk on the ground, etc. These types of objects are useful in ascertaining the orientation of a camera relative to the ground. Since complex shapes are difficult to directly control in a calculation process for detecting a vanishing point, a simple figure representing the detection object may be used for locating a vanishing point. For example, a box B is a simple figure that can generally represent the dimensions of the reference detection object. The vanishing point detecting module 100 detects a vanishing point from simple figures (e.g., boxes) representing the reference detection objects. Thus, the box B is set to have a similar size and area to that of the reference detection object in the image in order to replace the reference detection object. The box B according to the present exemplary embodiment has a rectangular shape or a circular shape, but may also be a geometrical figure having an elliptical shape or a polygonal shape such as a trapezoidal shape or a pentagonal shape. The reference detection object may be replaced by the box B.

The vanishing point detecting module 100 uses a plurality of boxes B to detect a vanishing point. For example, two or more boxes B may be used.

The vanishing point refers to a point at which a group of parallel lines, which are not parallel to a projected plane, intersect each other on a projected picture plane in the case of projecting a solid body. The vanishing point detecting module 100 of the camera modeling system 10 detects a first vanishing point and a second vanishing point in two directions. In the present exemplary embodiment, the vanishing point detecting module 100 detects a horizontal vanishing point as the first vanishing point and a vertical vanishing point as the second vanishing point. A method of detecting the horizontal vanishing point and the vertical vanishing point will be described later in detail with reference to FIGS. 3A, 3B, and 3C.

The view mode determining module 200 measures a first distance from a first position existing in the detection image to the first vanishing point detected by the vanishing point detecting module 100, measures a second distance from the first position to the second vanishing point detected by the vanishing point detecting module 100, and determines a camera view mode on the basis of the first distance and the second distance (S2). The camera view mode according to the present exemplary embodiment is any one selected from a side-view mode, a top-view mode, and a uniform-view mode. The side-view mode, the top-view mode, and the uniform-view mode may be divided according to the photographing directions of the camera. Objects are photographed in a horizontal direction in the side-view mode, objects are photographed in a vertical direction in the top-view mode, and objects are photographed in a diagonal direction in the uniform-view mode. For example, when an angle between the photographing direction and the horizontal plane is about 0 degree to about 25 degrees, the camera view mode may be defined as the side-view mode; when the angle is about 25 degrees to about 55 degrees, the camera view mode may be defined as the uniform-view mode; and when the angle is about 55 degrees to about 90 degrees, the camera view mode may be defined as the top-view mode. However, the specific angles of the respective view modes are merely exemplary, and exemplary embodiments are not limited thereto.

A method of determining whether the camera view mode is the side-view mode, the top-view mode, or the uniform-view mode will be described later in detail with reference to FIGS. 4A, 4B, and 4C.

The camera modeling module 300 selects a camera parameter determination mode according to the camera view mode determined by the view mode determining module 200 and performs camera modeling to determine camera parameters according to the selected camera parameter determination mode (S3). The camera parameter determination mode according to the present exemplary embodiment is any one selected from among an adaptive parameter determination mode and a direct parameter determination mode. Specific operations of the adaptive parameter determination mode and the direct parameter determination mode and a method of selecting these modes according to the camera view mode determined by the view mode determining module 200 will be described later in detail with reference to FIGS. 5A and 5B.

In the present exemplary embodiment, the vanishing point detecting module 100, the view mode determining module 200, and the camera modeling module 300 are implemented as separate modules performing different functions. However, in other exemplary embodiments, the vanishing point detecting module 100, the view mode determining module 200, and the camera modeling module 300 may be implemented as a single module performing a plurality of functions. These modules may be realized based on software running on a processor, one or more application specific integrated circuits (ASICs), or a combination thereof.

As used herein, the terms "correspondent points" refer to points that are located at the relatively same positions in two or more similar figures. For example, correspondent points of a pair of boxes refer to points that are located at the relatively same positions in a pair of similar boxes.

Figure 3A:
FIG. 3A is an exemplary diagram of a method for detecting a horizontal vanishing point according to an exemplary embodiment.

FIG. 3A is an exemplary diagram of a method for detecting a horizontal vanishing point according to an exemplary embodiment.

Referring to FIG. 3A, the vanishing point detecting module 100 according to the present exemplary embodiment detects a horizontal vanishing point through a horizontal vanishing point detecting method. The horizontal vanishing point is detected through boxes B1 to B4 in a detection image. Of course, more or less boxes may be used depending on the detection image.

In FIG. 3A, a reference detection object is illustrated only inside the box B1. The box B1 may be a simple figure that can generally represent the dimensions of the reference detection object illustrated inside the box 1 in FIG. 3A. The illustration of reference detection objects in the box B2 to B4 is omitted for the convenience, but each of the boxes B2 to B4 may also be a simple figure that can generally represent the dimensions of the reference detection object inside the each box B2 to B4.

Straight lines connecting correspondent points of at least one pair of boxes B among the boxes B in the detection image may be found, and intersection points of the straight lines may be found. For example, points P11 to P14 are correspondent points through which line L2 extends. The points (unlabeled) in the upper right hand corner of the boxes B1 to B4 are also correspondent points through which line L1 extends. The correspondent points of the boxes B may be points existing at corners of the boxes B or points existing in the boxes B.

The horizontal vanishing point may be found from the intersection points. For example, the vanishing point VP1 is located at the intersection of line L1 and line L2. The horizontal vanishing point may be found from the intersection points by various methods. For example, the horizontal vanishing point may be found from the intersection points by calculating an average value of the positions of the intersection points or by finding a mean value of the positions of the intersection points.

Also, the intersection points determined by different combinations may be the points of the same position. This is a case where the boxes B in the detection image are located on a straight line parallel to the ground surface. When the boxes B in the detection image are located on a straight line parallel to the ground surface, the intersection points derived from the combinations of the respective pairs of boxes B located on the straight line are the same points.

In an exemplary case illustrated in FIG. 3A, a first box B1, a second box B2, a third box B3, and a fourth box B4 are located on a straight line parallel to the ground surface. A straight line L1 connects the right top vertexes of the first box B1, the second box B2, the third box B3, and the fourth box B4. A straight line L2 connects the right bottom vertexes (P11 to P14) of the first box B1, the second box B2, the third box B3, and the fourth box B4. Lines L1 and L2 intersect each other at an intersection point VP1, which is a horizontal vanishing point in the exemplary case illustrated in FIG. 3A.

Figure 3B:
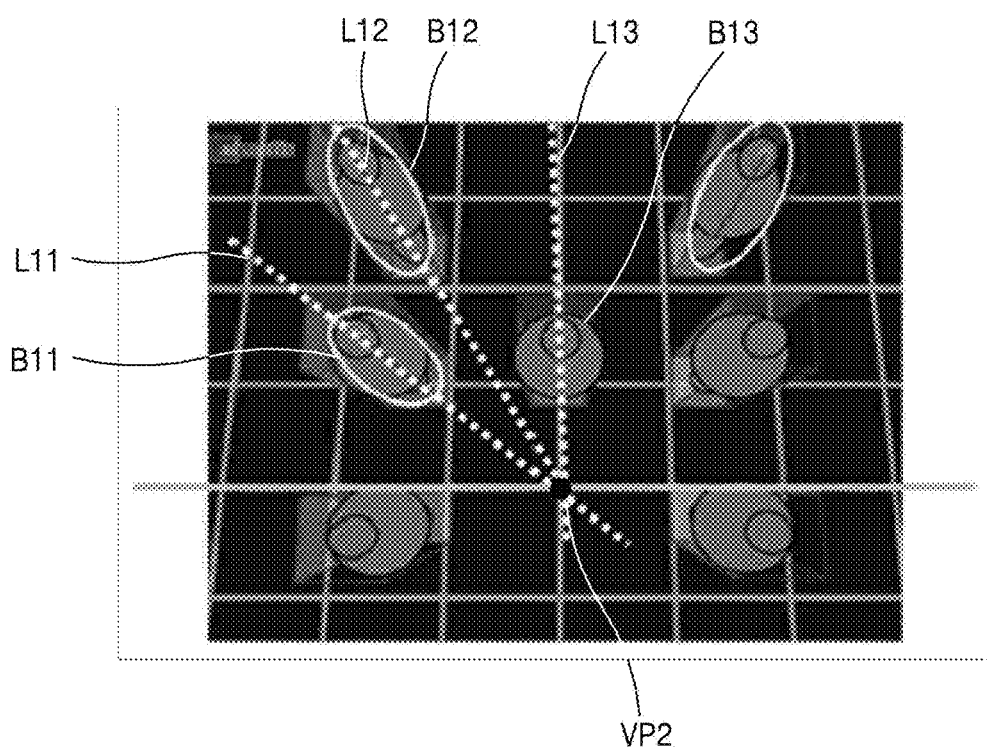
FIG. 3B is an exemplary diagram of a method for detecting a vertical vanishing point according to an exemplary embodiment.

FIG. 3B is an exemplary diagram of a method for detecting a vertical vanishing point according to an exemplary embodiment.

Referring to FIG. 3B, the vanishing point detecting module 100 according to the present exemplary embodiment detects a vertical vanishing point through a vertical vanishing point detecting method. The vertical vanishing point detecting method may be a method of finding an intersection point of straight lines that are drawn to connect the tops and the bottoms of respective boxes B in a detection image.

In detail, in the present exemplary embodiment, each box B represents a person or a mannequin that is a reference detection object. Thus, the top of a box B corresponds to the head of the person or the mannequin, and the bottom of the box B corresponds to the foot of the person or the mannequin. Since the person walks upright, a straight line connecting the head and the foot of the person is perpendicular to the ground surface. Thus, straight lines connecting the tops and the bottoms of the boxes B are perpendicular to the ground surface, and an intersection point of the straight lines is a vertical vanishing point. The vertical vanishing point may be detected inside or outside the detection image.

In an exemplary case illustrated in FIG. 3B, three straight lines L11, L12, and L13 connect the tops and the bottoms of boxes B11, B12, and B13, respectively. The three straight lines intersect each other at an intersection point VP2, which is a vertical vanishing point in the exemplary case illustrated in FIG. 3B.

Figure 3C:
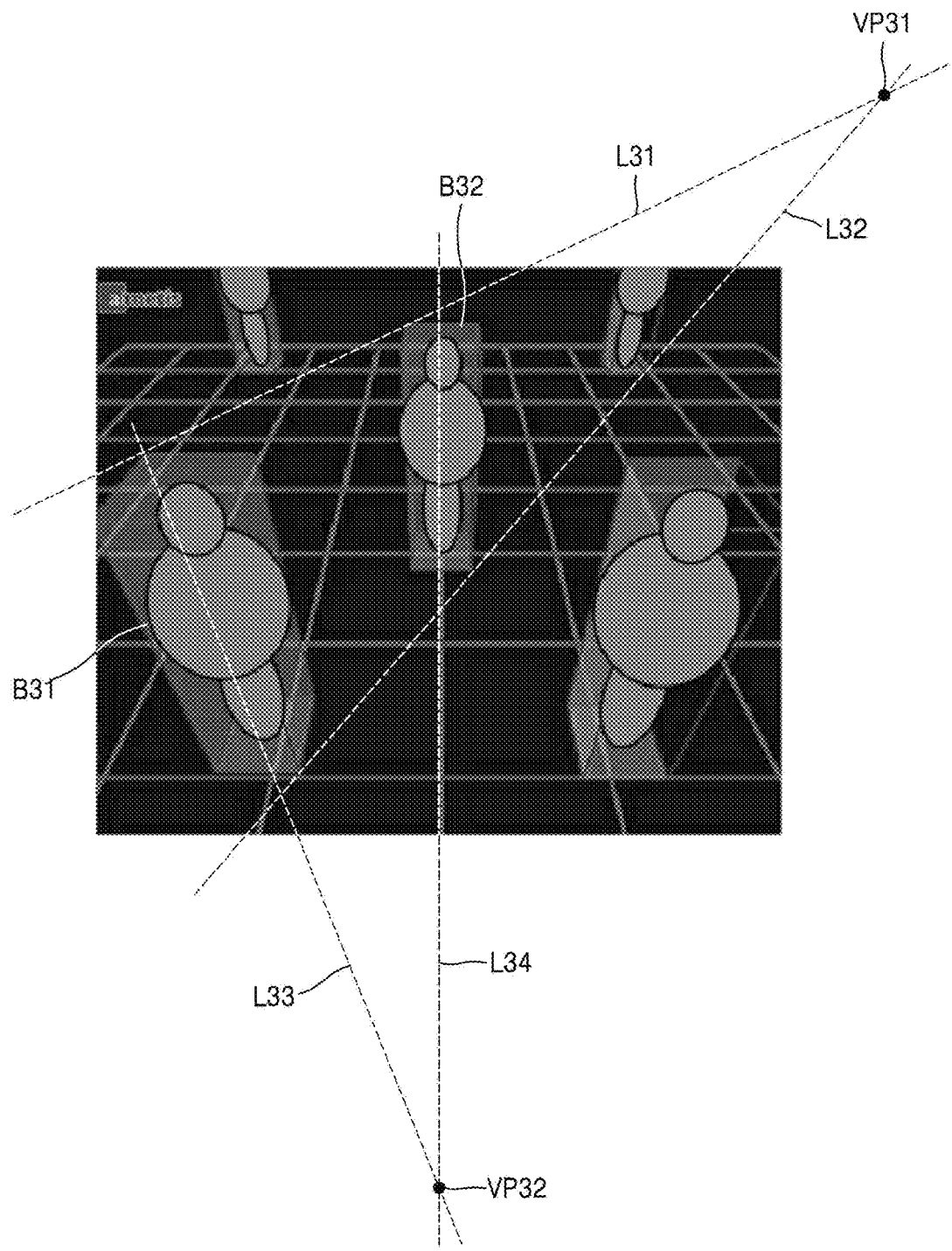
FIG. 3C is an exemplary diagram of a method for detecting a horizontal vanishing point and a vertical vanishing point according to an exemplary embodiment.

FIG. 3C is an exemplary diagram of a method for detecting a horizontal vanishing point and a vertical vanishing point according to an exemplary embodiment.

Referring to FIG. 3C, the vanishing point detecting module 100 according to the present exemplary embodiment detects a horizontal vanishing point through the horizontal vanishing point detecting method illustrated in FIG. 3A. In an exemplary case illustrated in FIG. 3C, a straight line L31 connecting the right top vertexes of boxes B31 and B32 and a straight line L32 connecting the right bottom vertexes of boxes B31 and B32 intersect each other at an intersection point VP31, which is a horizontal vanishing point in the exemplary case illustrated in FIG. 3C.

Referring to FIG. 3C, the vanishing point detecting module 100 according to the present exemplary embodiment detects a vertical vanishing point through the vertical vanishing point detecting method illustrated in FIG. 3B. In the exemplary case illustrated in FIG. 3C, a straight line L33 connecting the top and the bottom of the box B31 and a straight line L34 connecting the top and the bottom of the box B32 intersect each other at an intersection point VP32, which is a vertical vanishing point in the exemplary case illustrated in FIG. 3C.

The vanishing point detecting module 100 according to the present exemplary embodiment detects a horizontal vanishing point and a vertical vanishing point. However, exemplary embodiments are not limited thereto, the vanishing point detecting module 100 may detect a vanishing point in a direction that is perpendicular to both the horizontal direction and the vertical direction, or a vanishing point in a newly defined direction that is not the axial direction of the rectangular coordinate system.

Figure 4A:
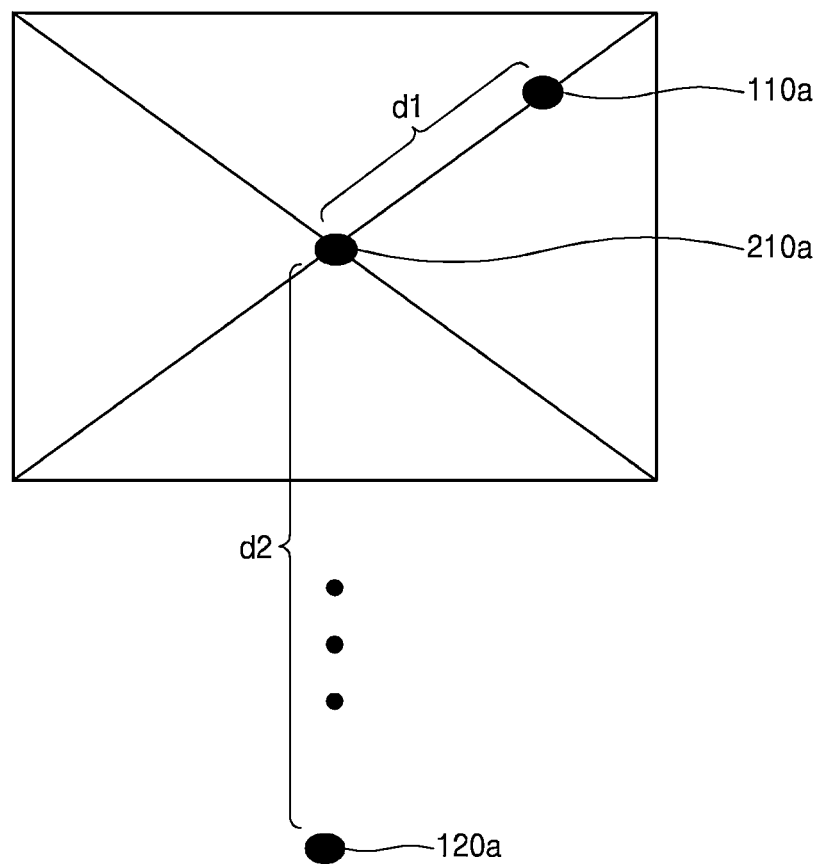
FIG. 4A is an exemplary diagram of a method for determining a camera view mode on the basis of a first position in a detection image illustrated in FIG. 3A and a distance between vanishing points detected from the detection image illustrated in FIG. 3A.

FIG. 4A is an exemplary diagram of a method for determining the camera view mode on the basis of a first position in a detection image illustrated in FIG. 3A and a distance between vanishing points detected from the detection image illustrated in FIG. 3A.

Referring to FIG. 4A, a first position 210a is located in the detection image illustrated in FIG. 3A, a horizontal vanishing point 110a is found from the detection image illustrated in FIG. 3A, and a vertical vanishing point 120a is found from the detection image illustrated in FIG. 3A.

That is, as the distance from the center of the detection image to a vanishing point in a direction increases, the probability of the camera viewing in the direction decreases. Thus, the first position 210a to be compared with the horizontal vanishing point 110a and the vertical vanishing point 120a may be at the center of the detection image, and the view mode determining module 200 of FIG. 1 may determine a camera view mode by comparing a first distance (d1) that is the distance between the first position 210a and the horizontal vanishing point 110a and a second distance (d2) that is the distance between the first position 210a and the vertical vanishing point 120a.

For example, when the first distance is smaller than the second distance (e.g., d1<d2), the camera may be oriented in the horizontal direction. Thus, in this case, the view mode determining module 200 may determine that the camera view mode is a side-view mode. On the other hand, when the second distance is smaller than the first distance (e.g., d1>d2), the camera may be oriented in the vertical direction. Thus, in this case, the view mode determining module 200 may determine that the camera view mode is a top-view mode. When the first distance and the second distance are similar to each other (e.g., d1≈d2), the camera may be oriented in the diagonal direction. Thus, in this case, the view mode determining module 200 may determine the camera view mode is a uniform-view mode. The first and second distances may be considered to be similar to each other based on the specific implementation. For example, when the difference between the first distance and the second distance is within a predetermined range, the view mode determining module 200 may determine that the first distance and the second distance are similar to each other. Also, when the ratio between the first distance and the second distance is within a predetermined range, the view mode determining module 200 may determine that the first distance and the second distance are similar to each other. Of course, there are other methods of determining when the first and second distances are similar to each other.

In an exemplary case illustrated in FIG. 4A, the horizontal vanishing point 110a exists inside the detection image illustrated in FIG. 3A, and the vertical vanishing point 120a exists outside the detection image while being distant from the detection image. Thus, since the distance between the first position 210a and the horizontal vanishing point 110a is smaller than the distance between the first position 210a and the vertical vanishing point 120a, the camera view mode of the camera viewing the detection image illustrated in FIG. 3A may be determined as the side-view mode.

Figure 4B:
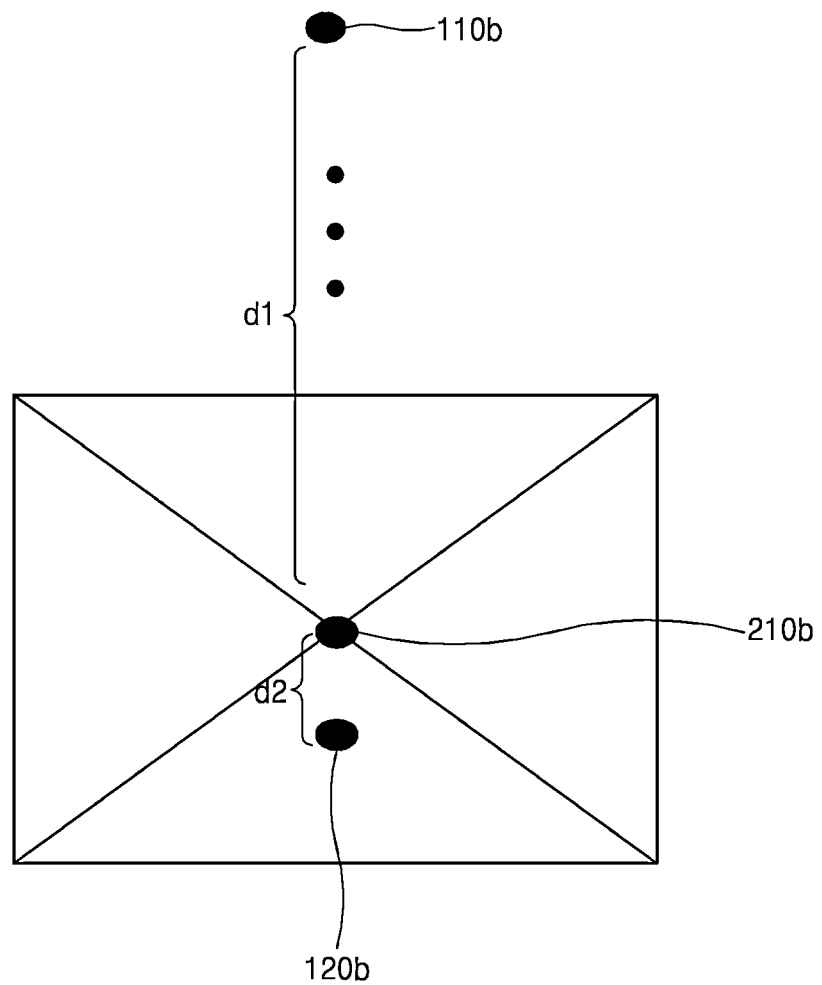
FIG. 4B is an exemplary diagram of a method for determining a camera view mode on the basis of a first position in a detection image illustrated in FIG. 3B and a distance between vanishing points detected from the detection image illustrated in FIG. 3B.

FIG. 4B is an exemplary diagram of a method for determining the camera view mode on the basis of a first position in a detection image illustrated in FIG. 3B and a distance between vanishing points detected from the detection image illustrated in FIG. 3B.

Referring to FIG. 4B, a first position 210b is located in the detection image illustrated in FIG. 3B, a horizontal vanishing point 110b is found from the detection image illustrated in FIG. 3B, and a vertical vanishing point 120b is found from the detection image illustrated in FIG. 3B.

Since a first position determining method and a camera view mode determining method illustrated in FIG. 4B are the same as those illustrated in FIG. 4A, descriptions thereof will be omitted herein.

In an exemplary case illustrated in FIG. 4B, the vertical vanishing point 120b exists inside the detection image illustrated in FIG. 3B, and the horizontal vanishing point 110b exists outside the detection image while being distant from the detection image. Thus, since the distance (d2) between the first position 210b and the vertical vanishing point 120b is smaller than the distance (d1) between the first position 210b and the horizontal vanishing point 110b, the camera view mode of the camera viewing the detection image illustrated in FIG. 3B may be determined to be the top-view mode.

Figure 4C:
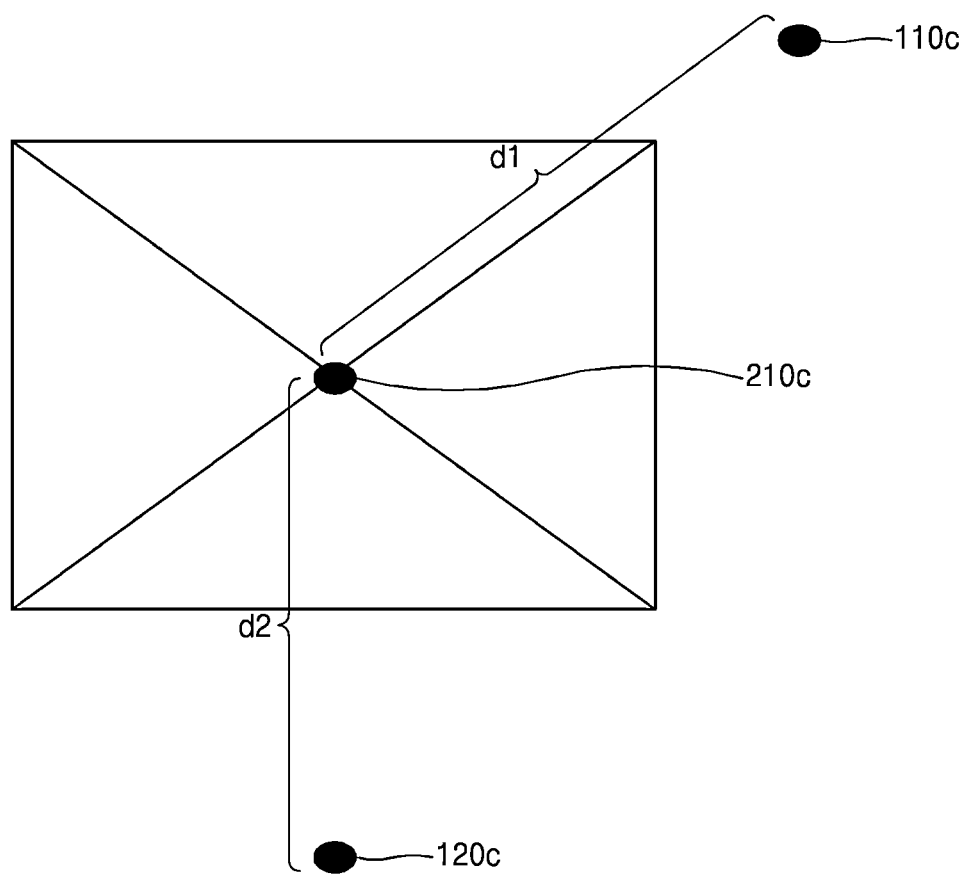
FIG. 4C is an exemplary diagram of a method for determining a camera view mode on the basis of a first position in a detection image illustrated in FIG. 3C and a distance between vanishing points detected from the detection image illustrated in FIG. 3C.

FIG. 4C is an exemplary diagram of a method for determining the camera view mode on the basis of a first position in a detection image illustrated in FIG. 3C and a distance between vanishing points detected from the detection image illustrated in FIG. 3C.

Referring to FIG. 4C, a first position 210c is located in the detection image illustrated in FIG. 3C, a horizontal vanishing point 110c is found from the detection image illustrated in FIG. 3C, and a vertical vanishing point 120C is found from the detection image illustrated in FIG. 3C.

Since a first position determining method and a camera view mode determining method illustrated in FIG. 4C are the same as those illustrated in FIG. 4A, descriptions thereof will be omitted herein.

In an exemplary case illustrated in FIG. 4C, the horizontal vanishing point 110c and the vertical vanishing point 120c are distant by similar distances from the detection image illustrated in FIG. 3C. Thus, it may be determined that the distance (d2) between the first position 210c and the vertical vanishing point 120c and the distance (d1) between the first position 210c and the horizontal vanishing point 110c are similar to each other. When the difference between the distance (d2) between the first position 210c and the vertical vanishing point 120c and the distance (d1) between the first position 210c and the horizontal vanishing point 110c is within a predetermined range, the view mode determining module 200 of FIG. 1 may determine that the distances d1 and d2 are similar to each other. Accordingly, the view mode determining module 200 of FIG. 1 may determine that the camera view mode of the camera viewing the detection image illustrated in FIG. 3C is the uniform-view mode. When determining that the camera view mode is the uniform-view mode, the view mode determining module 200 according to an exemplary embodiment may determine that the camera view mode is a uniform-view mode close to the side-view mode or a uniform-view mode close to the top-view mode.

For example, when the first distance (d1) between the first position 210c and the horizontal vanishing point 110c and the second distance (d2) between the first position 210c and the vertical vanishing point 120c are similar to each other and the first distance is smaller than the second distance, the view mode determining module 200 may determine that the camera view mode is a uniform-view mode close to the side-view mode. When the first distance and the second distance are similar to each other and the first distance is greater than the second distance, the view mode determining module 200 may determine that the camera view mode is a uniform-view mode close to the top-view mode. When the first distance and the second distance are equal to each other, the view mode determining module 200 may determine that the camera view mode is a uniform-view mode close to the side-view mode or a uniform-view mode close to the top-view mode, which may be preset by a system administrator.

The view mode determining module 200 according to the present exemplary embodiment determines that the camera view mode is any one selected from among the side-view mode, the top-view mode, and the uniform-view mode. However, exemplary embodiments are not limited thereto, the view mode determining module 200 may determine that the camera view mode is a bottom-view mode or a view mode of viewing in a newly defined direction.

Figure 5A:
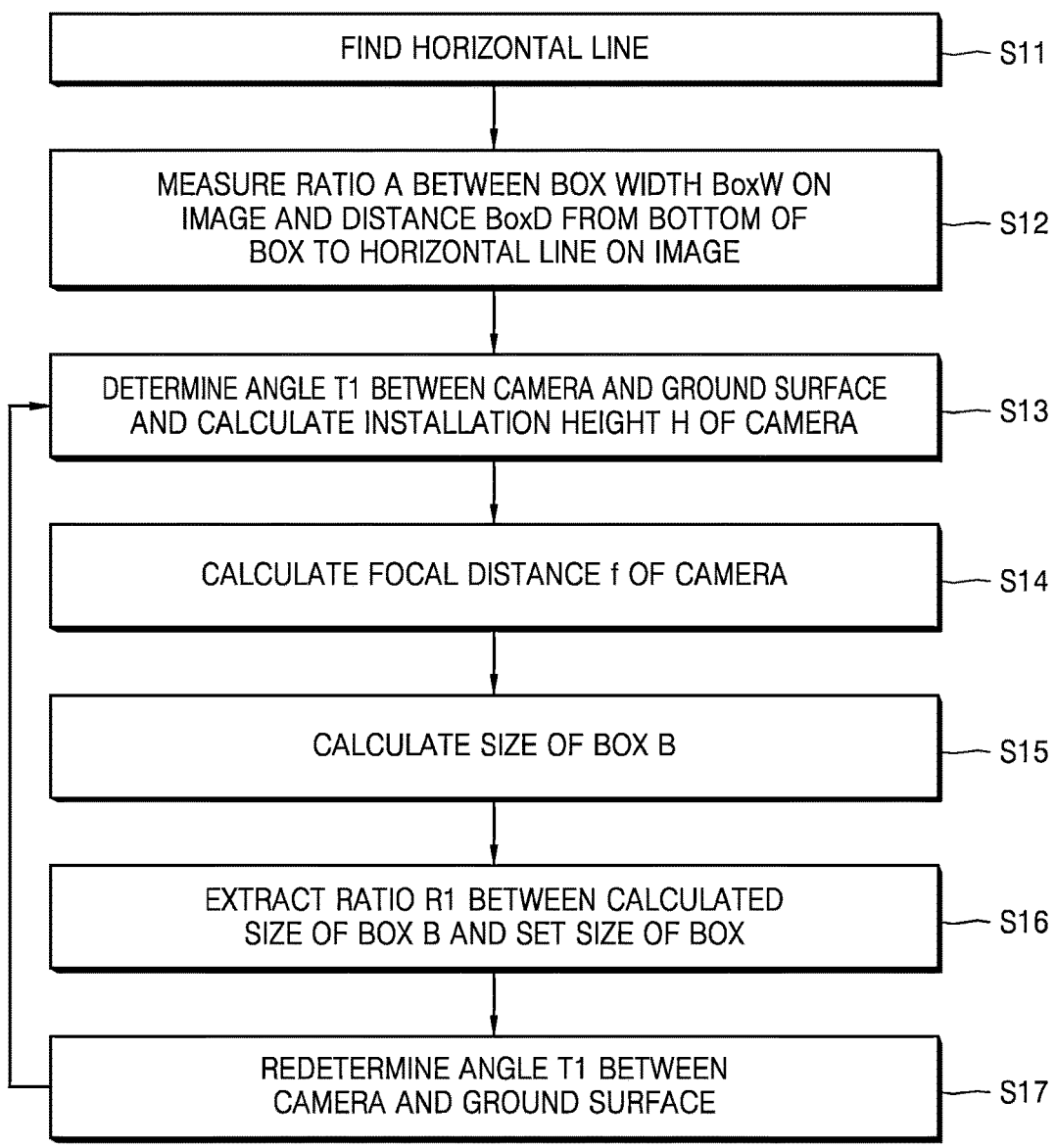
FIG. 5A is a flow diagram of an exemplary camera modeling mode in a case where a camera view mode is a side-view mode according to an exemplary embodiment.

FIG. 5A is a flow diagram of an exemplary camera modeling mode in a case where the camera view mode is the side-view mode according to an exemplary embodiment.

Referring to FIG. 5A, in the present exemplary embodiment, when the camera view mode is the side-view mode, the camera modeling mode repeatedly performs operations of: finding a horizontal line from a horizontal vanishing point (S11); measuring a ratio A between a box width BoxW on an image and a distance BoxD from the bottom of a box to the horizontal line on the image (S12); determining an angle T1 between a camera and the ground surface and calculating an installation height H of the camera (S13); calculating a focal distance f of the camera (S14); calculating a size of a box B (S15); extracting a ratio R1 between the calculated size of the box B and the set size of the box (S16); and redetermining the angle T1 between the camera and the ground surface according to the extracted ratio R1 (S17) and then returning to the operation of calculating the installation height H of the camera (S13). This is an adaptive parameter determination mode.

First, a horizontal line is found from a horizontal vanishing point (S11). When the camera does not rotate, the horizontal line is a straight line that passes through the horizontal vanishing point and is parallel to the horizontal axis of the camera. When the camera rotates, the horizontal line is a straight line that connects a first horizontal vanishing point that is determined in a state before the rotation of the camera and a second horizontal vanishing point that is newly determined in a state after the rotation of the camera.

After the horizontal line is found, a ratio A between a box width BoxW on a detection image of the camera and a distance BoxD from the bottom of a box B to the horizontal line on the detection image of the camera may be found by Equation (1) below (S12).

$$A = \frac{BoxD}{BoxW} \qquad \text{Equation (1)}$$

Thereafter, an angle T1 between the camera and the ground surface is determined, and an installation height H of the camera is calculated from the determined angle T1 between the camera and the ground surface (S13). According to the present exemplary embodiment, the initial angle T1 between the camera and the ground surface may be determined to have a value within the range of an actual angle of the camera. In the present exemplary embodiment, since the camera modeling mode in the case of the camera view mode being the side-view mode is the adaptive parameter determination mode, the correct value of the angle T1 between the camera and the ground surface may be found by adaptive adjustment from the initial value thereof. For example, the initial value of the angle T1 between the camera and the ground surface may be determined by Equation (2) below.

$$T1 = \cos^{-1}(A) \qquad \text{Equation (2)}$$

Hereinafter, a method of calculating the installation height H of the camera from the value of the angle T1 between the camera and the ground surface will be described in detail by equations.

When the angle between the camera and the bottom of the box B is "a"; the angle between the camera and the top of the box B is "b"; the distance from the foot of a vertical line, which is drawn down from the camera to the ground surface, to the bottom of the box B is "Z"; and the height of the box is "h", Equation (3) below is established.

$$\tan(a) = \frac{H}{Z}, \tan(b) = \frac{H-h}{Z} \qquad \text{Equation (3)}$$

Also, when the distance from the horizontal line to the bottom of the box B on the detection image of the camera is "pf"; the distance from the horizontal line to the top of the box B on the detection image of the camera is "ph"; and the distance from the top of the box B to the bottom of the box B on the detection image of the camera is "hi", Equations (4) to (6) below are established in association with the focal distance f of the camera.

$$pf = f\tan(a-T1) \qquad \text{Equation (4)}$$

$$ph = f\tan(b-T1) \qquad \text{Equation (5)}$$

$$hi = pf - ph = f\tan(a-T1) - f\tan(b-T1) = f(\tan(a-T1) - \tan(b-T1)) \qquad \text{Equation (6)}$$

Also, when the actual box width of the box B is "W", Equation (7) below is established in association with the box width BoxW in the detection image of the camera.

$$BoxW = \frac{W \cdot f}{\cos(a-T1) \cdot \sqrt{Z^2 + H^2}} = \frac{W \cdot f}{\cos(a-T1)} \cdot \frac{\sin(a)}{H} \qquad \text{Equation (7)}$$

The distance BoxD from the bottom of the box B to the horizontal line on the detection image of the camera is equal to the distance hi from the top of the box B to the bottom of the box B on the detection image of the camera in the case where the angle b between the camera and the top of the box B is 0. Thus, Equations (8) to (11) below are established.

$$BoxD = A \cdot BoxW, BoxD = f \cdot (\tan(a-T1) + \tan(T1)) \qquad \text{Equation (8)}$$

$$\therefore f \cdot (\tan(a-T1) + \tan(T1)) = A \cdot \frac{W \cdot f}{\cos(a-T1)} \cdot \frac{\sin(a)}{H} \qquad \text{Equation (9)}$$

$$\frac{\sin(a-T1)}{\cos(a-T1)} + \frac{\sin(T1)}{\cos(T1)} = A \cdot \frac{W}{H} \cdot \frac{\sin(a)}{\cos(a-T1)} \qquad \text{Equation (10)}$$

$$\therefore \frac{H}{W \cdot \cos(T1)} = A \qquad \text{Equation (11)}$$

In the present exemplary embodiment, the box B represents a person or a mannequin that is a reference detection object, and the box width W is given a value that may correspond to the width of a real person. Thus, when the angle T1 between the camera and the ground surface is determined and then the ratio A between the box width BoxW on the detection image of the camera and the distance BoxD from the bottom of the box B to the horizontal line on the detection image of the camera is found, the installation height H of the camera may be calculated from Equation (11).

The method of calculating the installation height H of the camera from the value of the angle T1 between the camera and the ground surface has been described above in detail by the equations.

Thereafter, the focal distance f of the camera is calculated (S14). When the distance from the center position of the image to the horizontal line on the detection image of the camera is "pH", the focal distance f of the camera is calculated by Equation (12) below.

$$f = \frac{pH}{\tan(T1)} \qquad \text{Equation (12)}$$

Thereafter, by using the determined value of the angle T1 between the camera and the ground surface, the calculated installation height H of the camera, and the calculated focal distance f of the camera, the distance hi from the top of the box B to the bottom of the box B on the detection image of the camera is calculated and found (S15). This calculation is performed by Equation (13) below, which is equal to Equation (6).

$$hi = pf - ph = f\tan(a-T1) - f\tan(b-T1) = f(\tan(a-T1) - \tan(b-T1)) \qquad \text{Equation (13)}$$

Thereafter, the ratio R1 between the calculated distance hi from the top of the box B to the bottom of the box B on the detection image of the camera and the size of the person or the mannequin (which is the detection object in the present exemplary embodiment) is extracted (S16). For example, the average height of the person may be set to 170 cm. In this case, when the calculated distance hi from the top of the box B to the bottom of the box B on the detection image of the camera is greater than the set height "170 cm", the ratio R1 is greater than 1. On the other hand, when the calculated distance hi from the top of the box B to the bottom of the box B on the detection image of the camera is smaller than the set height "170 cm", the ratio R1 is smaller than 1.

When the extracted ratio R1 is greater or smaller than 1, the determined angle T1 between the camera and the ground surface is redetermined (S17). For example, when the ratio R1 is greater than 1, since it means that the size of the detection object obtained from the calculated distance hi from the top of the box B to the bottom of the box B on the detection image of the camera is measured to be greater than the actual size thereof, the angle T1 between the camera and the ground surface may be determined to be greater than the actual value thereof. Thus, the angle T1 between the camera and the ground surface may be reset to a value smaller than the initial set value, and the camera modeling mode may return to the operation of calculating the installation height H of the camera (S13). After the adaptive parameter determination mode is repeatedly performed, when the extracted ratio R1 is equal to or sufficiently smaller than 1, the angle T1 between the camera and the ground surface, the installation height H of the camera, and the focal distance f of the camera in that case are the result values of camera modeling.

Figure 5B:
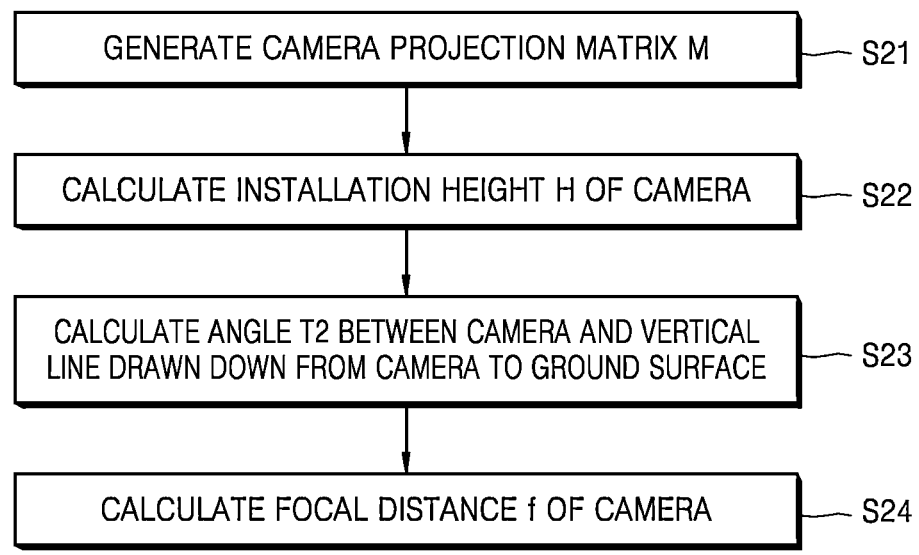
FIG. 5B is a flow diagram of an exemplary camera modeling mode in a case where a camera view mode is a top-view mode according to an exemplary embodiment.

FIG. 5B is a flow diagram of an exemplary camera modeling mode in a case where the camera view mode is the top-view mode according to an exemplary embodiment.

Referring to FIG. 5B, in the present exemplary embodiment, when the camera view mode is the top-view mode, the camera modeling mode performs operations of: generating a camera projection matrix M (S21); calculating the installation height H of the camera (S22); calculating the angle T2 between the camera and the vertical line drawn down from the camera to the ground surface (S23); and calculating the focal distance f of the camera (S24). This is a direct parameter determination mode for directly determining camera modeling parameters without repeated operations.

First, a camera projection matrix M is generated (S21). The camera projection matrix M is represented as Equation (14) below.

$$\begin{bmatrix} k \cdot x \\ k \cdot y \\ k \end{bmatrix} = \begin{bmatrix} f & 0 & mx \\ 0 & f & my \\ 0 & 0 & 1 \end{bmatrix} \begin{bmatrix} 1 & 0 & 0 \\ 0 & \cos(T2) & \sin(T2) \\ 0 & -\sin(T2) & \cos(T2) \end{bmatrix} \begin{bmatrix} X \\ Y \\ H \end{bmatrix} \quad \text{Equation (14)}$$

In the camera projection matrix M, "k" is a constant and it indicates that the ratio between three values on the left side maintains a ratio of x:y:1. "mx" is a constant having a half value of the pixel number in the horizontal direction of the detection image of the camera, and "my" is a constant having a half value of the pixel number in the vertical direction of the detection image of the camera. "X" is the horizontal distance between the box B and the camera, and "Y" is the vertical distance between the box B and the camera.

Thereafter, the installation height H of the camera is calculated (S22). In the detection image, Equations (15) and (16) below may be obtained from the camera projection matrix M.

$$x = \frac{f \cdot X}{-Y \cdot \sin(T2) + H \cdot \cos(T2)} \quad \text{Equation (15)}$$

$$y = \frac{f \cdot (Y \cdot \cos(T2) + H \cdot \cos(T2))}{-Y \cdot \sin(T2) + H \cdot \cos(T2)} \quad \text{Equation (16)}$$

Through Equations (15) and (16), the installation height H of the camera may be found as Equation (17) below.

$$H = \frac{xh \cdot h}{xh - xf} \quad \text{Equation (17)}$$

In Equation (17), "xh" is a horizontal coordinate from the center point of the detection image of the camera to the top of the box B, and "xf" is a horizontal coordinate from the center point of the detection image of the camera to the bottom of the box B.

Thereafter, the angle T2 between the camera and the vertical line drawn down from the camera to the ground surface is calculated (S23). Equation (18) below may be obtained from the camera projection matrix M and the equation for finding the installation height H of the camera.

$$\frac{(H - h) \cdot xh - H \cdot xf}{xh - xf} = Y \cdot \tan(T2) \quad \text{Equation (18)}$$

In Equation (18), "h" is the height of the box B. When $Y \cdot \tan(T2) = C$ is set in Equation (18), Equation (19) below is established.

$$\sin(T2) = \sqrt{\frac{yf \cdot (H - C) \cdot C - yh \cdot (H - h - C) \cdot C}{yh \cdot (H - h - C) \cdot H - yf \cdot (H - C) \cdot (H - h)}} \quad \text{Equation (19)}$$

When the arcsine is taken on both sides of Equation (19), the angle T2 between the camera and the vertical line drawn down from the camera to the ground surface may be obtained by Equation (20) below.

$$T2 = \sin^{-1} \sqrt{\frac{yf \cdot (H - C) \cdot C - yh \cdot (H - h - C) \cdot C}{yh \cdot (H - h - C) \cdot H - yf \cdot (H - C) \cdot (H - h)}} \quad \text{Equation (20)}$$

Thereafter, the focal distance f of the camera is calculated (S24). When the distance between the vertical vanishing point and the center point of the detection image of the camera is "v", Equation (21) below is established. The focal distance f of the camera may be calculated from Equation (21).

$$f = \frac{v}{\tan(T2)} \quad \text{Equation (21)}$$

When the camera view mode is the uniform-view mode, the camera modeling module 300 according to an exemplary embodiment may determine camera modeling parameters by using the camera modeling mode illustrated in FIG. 5A, the camera modeling mode illustrated in FIG. 5B, or a combination thereof.

Even when the camera view mode was determined as the uniform-view mode, the camera modeling module 300 may determine the parameter determination mode according to the ratio between the distance between a horizontal vanishing point and a first position in an image captured by the camera and the distance between a vertical vanishing point and the first position.

For example, when the distance between the first position and the horizontal vanishing point is smaller than the distance between the first position and the vertical vanishing point, the camera modeling module 300 may determine the camera view mode as a uniform-view mode close to the side-view mode and perform camera modeling by using the adaptive parameter determination mode illustrated in FIG. 5A.

On the other hand, when the distance between the first position and the horizontal vanishing point is greater than the distance between the first position and the vertical vanishing point, the camera modeling module 300 may determine the camera view mode as a uniform-view mode close to the top-view mode and perform camera modeling by using the direct parameter determination mode illustrated in FIG. 5B.

However, exemplary embodiments are not limited thereto. For example, when the camera view mode is the uniform-view mode, the camera modeling module 300 may be preset to perform camera modeling always by using the adaptive parameter determination mode illustrated in FIG. 5A. As another example, when the camera view mode is the uniform-view mode, the camera modeling module 300 may be preset to perform camera modeling always by using the direct parameter determination mode illustrated in FIG. 5B. As another example, when the camera view mode is the uniform-view mode, the camera modeling module 300 may be preset to perform primary camera modeling by using the adaptive parameter determination mode illustrated in FIG. 5A, perform secondary camera modeling by using the direct parameter determination mode illustrated in FIG. 5B, and then perform final camera modeling by using a combination of the primary camera modeling result and the secondary camera modeling result. For example, the final camera modeling parameters may be calculated by averaging the primary camera modeling result and the secondary camera modeling result.

The camera modeling module 300 according to the present exemplary embodiment uses the direct parameter determination mode and the adaptive parameter determination mode defined by the above equations. However, exemplary embodiments are not limited thereto, and the camera modeling module 300 may use a direct parameter determination mode or an adaptive parameter determination mode that may be defined in other ways.

As described above, according to the one or more of the above exemplary embodiments, the camera modeling system may automatically perform camera modeling by detecting the angle, the focal distance, the installation height, and the view mode of the camera from one or more reference detection objects.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera calibration system comprising at least one processor which implements:
   a vanishing point detecting module configured to detect, from at least one reference detection object existing in a detection region, a first vanishing point and a second vanishing point;
   a view mode determining module configured to determine a camera view mode on the basis of a result of comparing a distance from a position in the detection region to the first vanishing point with a distance from the position to the second vanishing point, by determining the camera view mode, among a plurality of predetermined camera view modes corresponding to a plurality of predetermined camera calibration methods, that corresponds to the result of the comparing; and
   a camera calibration module configured to select a camera calibration method corresponding to the determined camera view mode among the plurality of predetermined camera calibration methods, and perform camera calibration through the selected camera calibration method,
   wherein the determined camera view mode corresponds to an angle between a photographing direction of a camera capturing the detection region and a horizontal plane, the angle being determined on the basis of the result of the comparing.

2. The camera calibration system of claim 1, wherein the vanishing point detecting module is configured to detect the first and second vanishing points from a plurality of reference detection objects and is further configured to surround each reference detection object with a respective box;
   the first vanishing point is derived from intersection points of straight lines connecting correspondent points of at least one pair of boxes among the boxes; and
   the second vanishing point is an intersection point of straight lines connecting tops and bottoms of the boxes respectively.

3. The camera calibration system of claim 1, wherein the position is a center of the detection region.

4. The camera calibration system of claim 1, wherein the view mode determining module is further configured to determine the camera view mode according to a difference between the distance from the position to the first vanishing point and the distance from the position to the second vanishing point.

5. The camera calibration system of claim 1, wherein the plurality of predetermined camera view modes comprises a side-view mode, a top-view mode, and a uniform-view mode, the uniform-view mode being a mode between the side-view mode and the top-view mode with respect to the determined angle.

6. The camera calibration system of claim 5, wherein the camera calibration module is further configured to:
   perform the camera calibration by selecting an adaptive parameter determination mode as the camera calibration method, when the camera view mode is the side-view mode;
   perform the camera calibration by selecting a direct parameter determination mode as the camera calibration method, when the camera view mode is the top-view mode; and
   perform the camera calibration by selecting one of the adaptive parameter determination mode, the direct parameter determination mode, or a combination of the adaptive parameter determination mode and the direct parameter determination mode as the camera calibration method, when the camera view mode is the uniform-view mode.

7. The camera calibration system of claim 5, wherein the uniform-view mode includes one from among a first uniform-view mode when the determined angle is closer to an angle corresponding to the side-view mode than an angle corresponding to the top-view mode and a second uniform-view mode when the determined angle is closer to the angle corresponding to the top-view mode than the angle corresponding to the side-view mode.

8. The camera calibration system of claim 7, wherein the camera calibration module is further configured to:
perform the camera calibration by selecting an adaptive parameter determination mode as the camera calibration method, when the camera view mode is the first uniform-view mode; and
perform the camera calibration by selecting a direct parameter determination mode as the camera calibration method, when the camera view mode is the second uniform-view mode.

9. A camera calibration method comprising:
detecting a first vanishing point and a second vanishing point from a plurality of reference detection objects existing in a detection region;
determining a camera view mode on the basis of a result of comparing a distance from a position in the detection region to the first vanishing point with a distance from the position to the second vanishing point, by determining the camera view mode, among a plurality of predetermined camera view modes corresponding to a plurality of predetermined camera calibration methods, that corresponds to the result of the comparing; and
selecting a camera calibration method corresponding to the determined camera view mode among the plurality of predetermined camera calibration methods, and performing camera calibration through the selected camera calibration method.

10. An apparatus comprising:
a processor configured to:
identify an object in a detection region as a reference detection object that provides orientation information relative to a surface;
detect a first vanishing point based on the reference detection object;
detect a second vanishing point based on the reference detection object;
detect a first distance between a first point in the detection region and the first vanishing point;
detect a second distance between the first point and the second vanishing point;
determine an orientation of a camera capturing the detection region based on a result of comparing the first distance with the second distance;
determine a view mode of the camera, among a plurality of predetermined view modes of the camera corresponding to a plurality of predetermined camera calibration methods, that corresponds to the determined orientation of the camera;
select a camera calibration method corresponding to the determined view mode of the camera among the plurality of predetermined camera calibration methods; and
perform camera calibration through the selected camera calibration method.

11. The camera calibration system of claim 1, wherein the first vanishing point is a vertical vanishing point and the second vanishing point is a horizontal vanishing point.

12. The camera calibration system of claim 5, wherein when the determined angle is less than 25 degrees, the determined camera view mode is the side-view mode,
wherein when the determined angle is greater than or equal to 25 degrees and less than or equal to 55 degrees, the determined camera view mode is the uniform-view mode, and
wherein when the determined angle is greater than 55 degrees and less than or equal to 90 degrees, the determined camera view mode is the top-view mode.

13. The camera calibration system of claim 7, wherein when the determined angle is less than 25 degrees, the determined camera view mode is the side-view mode,
wherein when the determined angle is greater than or equal to 25 degrees and less than or equal to 55 degrees and closer to 25 degrees than 55 degrees, the determined camera view mode is the first uniform-view mode,
wherein when the determined angle is greater than or equal to 25 degrees and less than or equal to 55 degrees and closer to 55 degrees than 25 degrees, the determined camera view mode is the second uniform-view mode, and
wherein when the determined angle is greater than 55 degrees and less than or equal to 90 degrees, the determined camera view mode is the top-view mode.

14. The camera calibration system of claim 6, wherein when the selected camera calibration method is the adaptive parameter determination mode, the camera calibration module is further configured to:
find a horizontal line from the first vanishing point;
measure a ratio of a distance from a bottom of a box on an image of the object to the horizontal line on the image to a width of the box;
determine an angle between the camera and a ground surface and calculate an installation height of the camera;
calculate a focal distance of the camera;
calculate a size of the box; and
extract a ratio of the calculated size of the box to a pre-set size of the box.

15. The camera calibration system of claim 14, wherein the camera calibration module is further configured to:
redetermine the angle between the camera and the ground surface according to the extracted ratio and perform again the operation of calculating the installation height of the camera.

* * * * *